United States Patent
Petrucelli

(10) Patent No.: US 7,122,750 B2
(45) Date of Patent: *Oct. 17, 2006

(54) DUAL DISPLAY WEIGHT MEASURING APPARATUS

(75) Inventor: Steven Petrucelli, Cranbury, NJ (US)

(73) Assignee: Measurement Limited

( * ) Notice: Subject to any disclaimer, the term of this patent is extended or adjusted under 35 U.S.C. 154(b) by 163 days.

This patent is subject to a terminal disclaimer.

(21) Appl. No.: 10/772,706

(22) Filed: Feb. 5, 2004

(65) Prior Publication Data

US 2004/0238233 A1    Dec. 2, 2004

Related U.S. Application Data

(63) Continuation-in-part of application No. 10/086,303, filed on Feb. 28, 2002, now Pat. No. 6,689,964.

(60) Provisional application No. 60/272,139, filed on Feb. 28, 2001.

(51) Int. Cl.
*G01G 23/375* (2006.01)
*G01G 23/18* (2006.01)
*G01G 23/37* (2006.01)

(52) U.S. Cl. .................. 177/173; 177/177; 177/210 R; 177/DIG. 3; 177/DIG. 6; 341/11

(58) Field of Classification Search ................ 177/173, 177/177, 178, 256, DIG. 3, DIG. 6, 210 R; 341/11
See application file for complete search history.

(56) References Cited

U.S. PATENT DOCUMENTS 2,812,904 A * 11/1957 Kolisch ...................... 705/414
3,134,451 A * 5/1964 Hanssen ....................... 177/225
3,478,618 A * 11/1969 Provi et al. .................... 74/519
3,627,069 A * 12/1971 Ray et al. .............. 177/210 FP
3,739,866 A * 6/1973 Hino et al. ................... 177/178
3,967,271 A * 6/1976 Day ............................... 341/6
3,968,848 A * 7/1976 Cherney et al. ............. 177/123
4,020,912 A    5/1977 Hino et al. ................... 177/178
4,155,413 A    5/1979 Angst ........................... 177/178
4,258,812 A    3/1981 Pfeiffer .................... 177/210 R
4,326,596 A    4/1982 Beck ............................ 177/178
5,069,299 A * 12/1991 Haroutel ................... 177/25.15
5,141,065 A * 8/1992 Maxwell et al. ......... 177/210 R
6,410,863 B1* 6/2002 Cappiello ................. 177/25.13
6,608,260 B1    8/2003 Montagnino et al. .... 177/25.11
6,689,964 B1* 2/2004 Petrucelli ..................... 177/177

FOREIGN PATENT DOCUMENTS

JP    56-137218 A * 10/1981 ................. 177/178
JP    56-151321 A * 11/1981 ................. 177/178
JP    56-151323 A * 11/1981 ............. 177/210 R

* cited by examiner

*Primary Examiner*—Randy W. Gibson
(74) *Attorney, Agent, or Firm*—Plevy, Howard & Darcy, PC

(57) ABSTRACT

A mechanical weighing scale having mechanical parts driving a pointer rotating around a fixed disc or dial having slots or holes formed therein. The mechanical pointer operates to provide an analog display of one's weight to the user. An optical sensor system is responsive to the mechanical motion of the mechanically-rotating pointer as it passes over each of the holes or slots for determining a number of counts associated with the mechanical motion of the rotating pointer and translating the counts to a corresponding weight value for display onto a digital display.

25 Claims, 12 Drawing Sheets

DUAL DISPLAY WEIGHT MEASURING APPARATUS

This application is a continuation-in-part of U.S. patent application Ser. No. 10/086,303, filed Feb. 28, 2002, now U.S. Pat. No. 6,689,964 entitled: DUAL DISPLAY WEIGHT MEASURING APPARATUS WHICH DETECTS MOVEMENT OF THE POINTER THROUGH SLITS IN THE MECHANICAL DIAL FACE which is based on U.S. Provisional Application Ser. No. 60/272,139, filed Feb. 28, 2001, entitled: DUAL DISPLAY WEIGHT MEASURING APPARATUS.

FIELD OF INVENTION

The present invention relates to measurement devices in general and more particularly to a weight measuring apparatus having both analog and digital output displays for displaying the weight of a user.

DESCRIPTION OF PRIOR ART

There exists in the prior art numerous methods and apparatus for measuring and displaying body weight. For example, various types of platform scales have been designed and manufactured by scale manufacturers. These scales include a conventional mechanical analog scale having a base and a platform movable relative to the base. A lever structure is movable with the platform for causing rotation of a dial. Angular rotation of the dial represents weight on the platform which is indicated by numerical indicia on the dial and is visible through a window in the platform. U.S. Pat. No. 5,141,065 entitled WEIGHT ACTIVATED PLATFORM SCALE issued Aug. 25, 1992 to Maxwell et al. discloses an electronic-mechanical version that replaces a rotary dial display with a digital readout. The dial forms part of an electrical encoder. As is conventionally understood, the encoder may take one of two known forms, namely a pulse count type which counts pulses representing angular movement, or an encoded type in which the dial is provided with a coded pattern. The coded pattern indicates angular position which is read by a sensor and converted to a measure of weight. Lastly, a strain gauge type scale includes a strain gauge for measuring pressure applied on the platform which is converted to an electrical signal applied to a digital readout.

While the prior art includes both mechanical analog scales as well as electronic digital scales for measuring and displaying a user's weight, a need in the art exists to provide a user with the option to measure and view the measured weight through either digital or analog means.

SUMMARY OF THE INVENTION

The invention is embodied in a mechanical weighing scale having mechanical parts driving a pointer rotating around a fixed disc or dial having slots or holes formed therein. The mechanical pointer operates to provide an analog display of one's weight to the user. An optical sensor system is responsive to the mechanical motion of the mechanically-rotating pointer as it passes over each of the holes or slots for determining a number of counts associated with the mechanical motion of the rotating pointer and translating the counts to a corresponding weight value for display onto a digital display. The optical sensor system includes a series of photo detectors placed underneath corresponding ones of the holes or slots, and operates for detecting when the pointer passes over a corresponding slot on the dial so as to trigger an electrical signal which functions as a pulse count to a microprocessor unit. Each time the pointer passes over a slot, a corresponding photo detector is triggered causing a pulse count to be sent to the microprocessor. When the pointer stops rotating, corresponding to a given weight value, the microprocessor totals the number of pulse counts and converts that to a digital weight representation. In this manner the scale has both a visual analog output indicated by the pointer's angular position as well as a digital display output corresponding to the number of pulses sensed by the optical sensor system due to the rotating pointer.

Alternatively, the invention is embodied in a mechanical weighing scale having mechanical parts responsive to a weight disposed thereon for driving a rotatable shaft. A pointer coupled to the shaft rotates in accordance with the shaft about a fixed disc having indicia thereon for determining an analog representation of a user's weight. A rotatable disc or wheel is also coupled to the rotatable shaft for rotating therewith. The disc or wheel includes slots or holes formed therein. An optical sensor disposed at a fixed position relative to the rotatable wheel operates to sense the mechanical rotation of the wheel via the slots or holes formed therein and determines a number of counts associated with the mechanical motion and translates the counts to a corresponding weight value for display onto a digital display via a digital processor. The optical sensor comprises a photo detector fixedly positioned relative to the rotating disc or wheel to detect wheel movement via the corresponding holes or slots thereon so as to trigger an electrical signal which functions as a pulse count to a microprocessor unit. Each time a slot on the disc passes over the photo detector, the detector is triggered causing a pulse count to be sent to the microprocessor. When the disc stops rotating, corresponding to a given weight value, the microprocessor totals the number of pulse counts and converts that to a digital weight representation for display.

DETAILED DESCRIPTION OF THE
PREFERRED EMBODIMENT

Figure 1A:
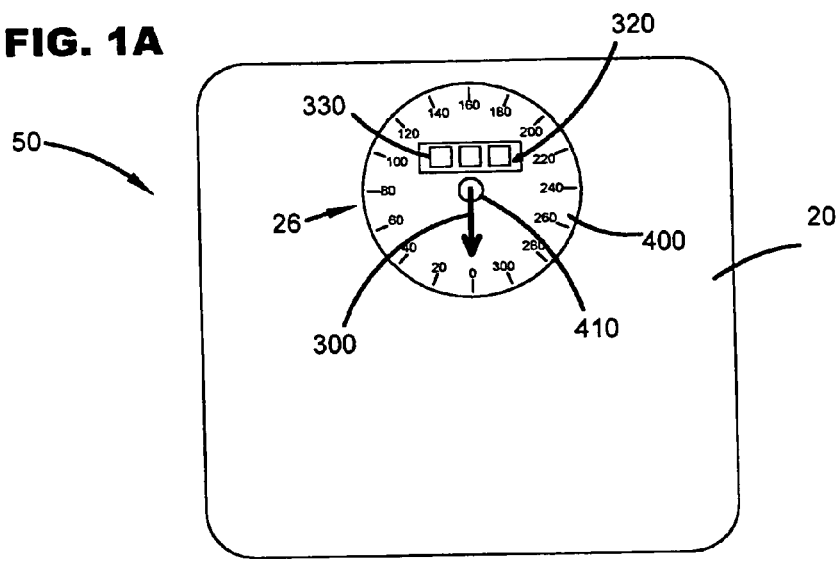
FIG. 1A is a top plan view of the dual display weight scale according to the present invention.
Figure 1B:
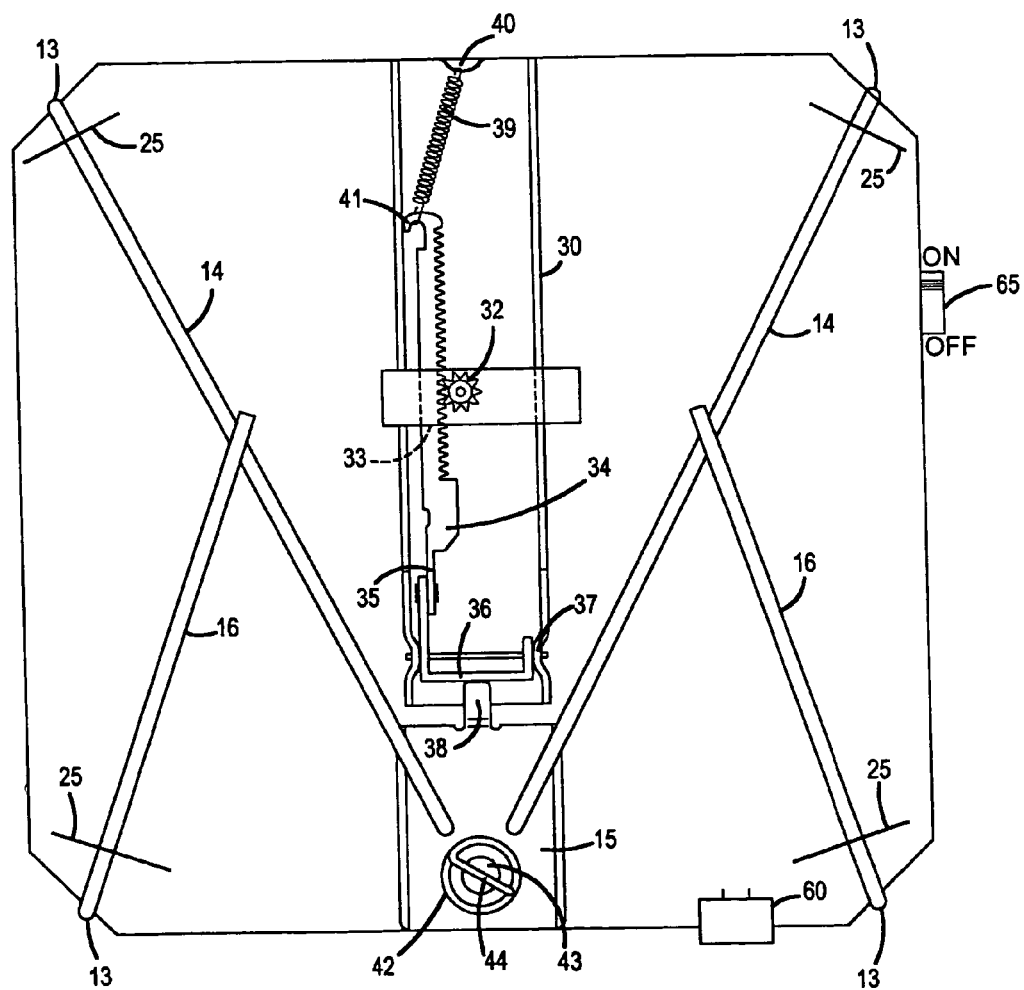
FIG. 1B is a top plan view of the dual display weight scale with the weight receiving platform removed showing conventional internal structure of the scale.

As shown in the drawings, and in particular, with reference to FIGS. 1A and 1B, a mechanical platform bathroom scale comprises a conventional base 10 formed from a stamped metal sheet, for example, for accommodating a mechanical scale mechanism, and a platform 20 adapted to be disposed over the base and coupled thereto via hangers 25 in conventional fashion. The platform 20 provides a weight receiving surface upon which a person may stand. In conventional fashion, weight is then transferred by the metal hangers to various levers within the scale mechanism to cause the levers and calibrating plate 15 to move toward the base. The operation of such a conventional mechanical scale is disclosed in U.S. Pat. No. 5,141,065 entitled WEIGHT ACTIVATED PLATFORM SCALE issued Aug. 25, 1992 to Maxwell et al.

As disclosed therein, and as shown in FIG. 1B, the weight sensing mechanism of a conventional mechanical scale 10 comprises a pair of primary levers 14 and a pair of secondary levers 16 arranged in interconnected fashion and resting upon slots 13. The pair of primary levers 14 are joined to calibrating member or plate 15. The primary levers are each arranged on edge relative to the base and 15 have an inverted V-notch, (not shown) across the thickness of the lever material to rest upon the slots 13 at the rear of the base 10.

The secondary levers 16 have inverted V-notch portions (not shown) which rest upon the slots 13 in the front of the base 10. The other end of each of the secondary levers 16 is connected to and hangs below a primary lever 14 intermediate its ends by means of a bracket 18. Each of the primary and secondary levers 14 and 16 has a V-portion 19 located adjacent to the corner portion which supports the levers and is adapted to support metal hangers 20 which rest in the V-portion of each respective lever.

The weight-sensing mechanism is mounted on a channel support 30 secured to the base 10. In accordance with an aspect of the present invention, rotary dial 27 (see FIG. 2) is turned by shaft 32 which is part of and rotated by a pinion gear 33. The pinion gear 33 is turned by a substantially horizontally extending rack 34 which is pivotally secured to lever 35. The lever 35 comprises a bracket pivotally supported on a rod 36 extending transversely through the crank sides and pivotally journaled in a support member 37. The rack 34 is pivotally connected at 38 to a lower end of the crank 35 to move with movement of the bell crank 35 and is held in engagement with pinion gear 33 by means of a spring 39 connected at 40 to a side wall of the base and connected at 41 to the rack 34.

A coil detention spring 42 is mounted upon a swivel post 43 which is loose and capable of moving on the bottom coils of the spring 42 threadably supporting the calibrating plate 15. The post 43 has a slot 44 across its upper end for receiving and supporting top end of the coil spring 42. A kick switch 60 is located on a side wall of the scale for turning on the electronic or digital readout of the scale. Upon actuation, an internal electrical circuit is energized so as to set or reset the electronic display to zero. Power on/off switch 65 may be used in conventional fashion to enable/disable energy from a power source such as a battery (not shown).

As shown in FIG. 1A, platform portion 20 further includes a display portion comprising an analog display and a digital display. The analog display comprises a disc 400 (i.e. dial) or wheel over which passes a rotatable pointer for determining a measured weight of a user. The digital display comprises an LCD display for example coupled to appropriate electronic circuitry including a microprocessor for example, for providing a digital readout determining a measured weight of a user. A transparent window area 26 on the surface of the platform comprising a plastic, for example, permits viewing of the analog and digital displays, located beneath platform 20 by the user.

Figure 2:
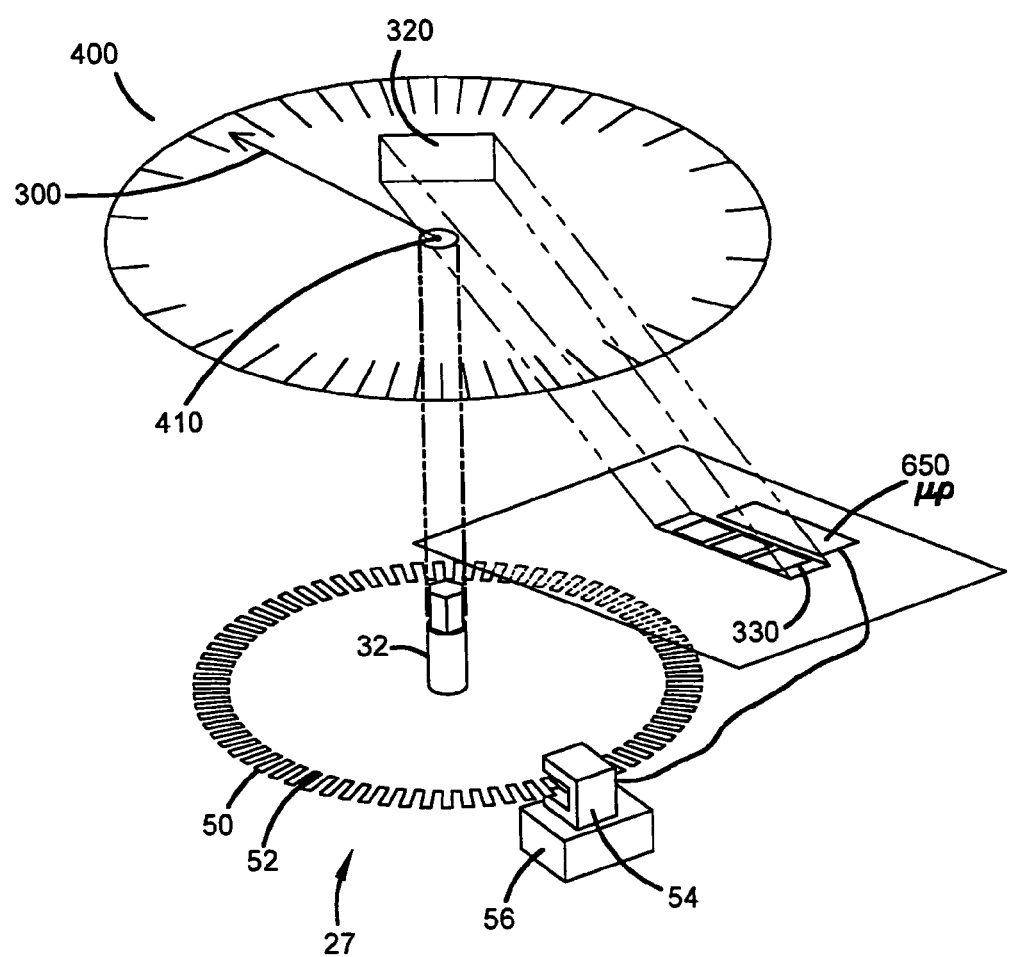
FIG. 2 is a schematic illustration of the dual display system according to an embodiment of the present invention.

As shown in FIG. 2, the scale includes an optical pulse counter wherein dial 27 configured as a circular disc has a plurality of circumferentially spaced, radially extending tabs 50 defining slots 52 therebetween. An optical sensing system is configured as an optical interrupter 54 comprising two photosensing elements arranged in conventional fashion for sensing rotary movement of the dial 27 and generating pulse signals in response thereto. The optical interrupter 54 includes a support 56 carrying the photosensitive elements.

According to an aspect of the present invention, shaft 32 of the base scale structure 10 (of FIG. 1B) extends through rotary dial 27. Shaft 32 also extends through a first circular cavity 410 of substantially flat disc 400 having indicia thereon as shown in FIG. 1A.

Disc 400 further includes a second cavity 320 formed as a window to accommodate LCD display 330 for displaying a digital output weight measurement to the user based on the rotating dial 27 and optical sensing system. A rotary pointer 300 has a stem portion (not shown) adapted to receive the top end of shaft 32 for securing thereto which operates to couple the pointer to the shaft such that rotation of the shaft 32 causes a corresponding rotation of the pointer. In this manner, the rotatable pointer points to the corresponding indicia on flat disc 400 associated with the measured weight of the user based on the mechanical weight sensing mechanism due to rotation of the shaft 32.

Contemporaneous with rotation of the rotatable pointer about fixed flat disc 400, the optical sensor system coupled rotatable disc 27 operates to count the number of pulses associated with rotation of disc 27 and provide the information to a processor 650 and associated electronics such as a microprocessor for display via digital display device 330 such as an LCD as shown herein.

Figure 6:
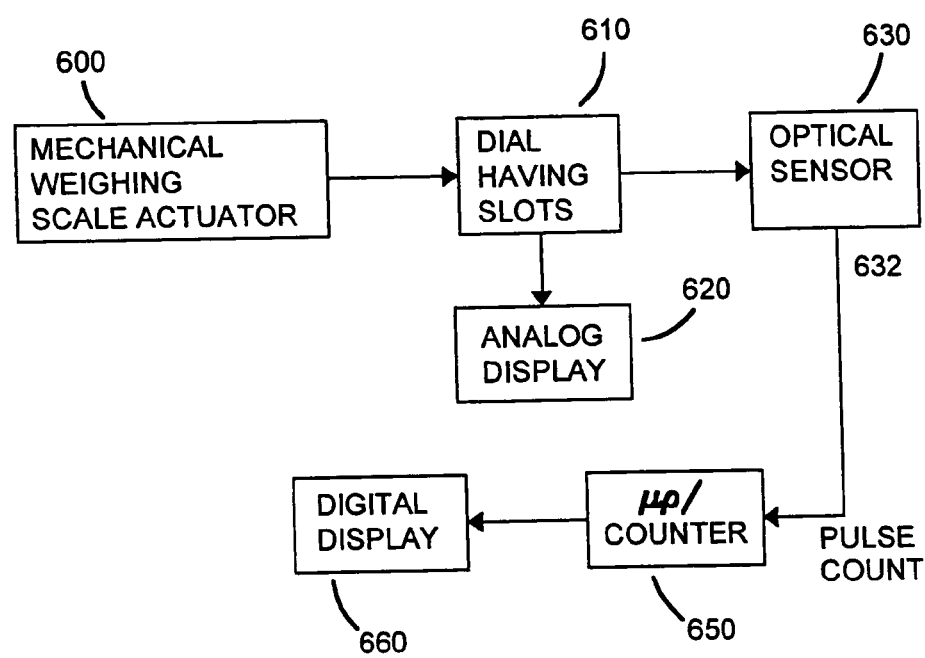
FIG. 6 is a block diagram of the major functional components of the dual display system.

In this manner, a user is presented with both an analog output via the mechanical pointer 300 and shaft 32 via fixed disc 400, as well as a digital output of the user's weight based on rotation of disc 27, optical sensor system, microcontroller unit and LCD display. FIG. 6 provides a schematic block diagram depicting the general processing and display of information associated with the dual analog and digital measurement and display of a user's weight comprising a mechanical weighing scale actuator 600 for driving a pointer on dial arrangement 610 for providing an analog display 620. The dial arrangement includes slots such that an optical sensor 630 positioned relative to the dial arrangement provides a signal such as a pulse count responsive to the movement of the pointer over the slots which is provided to processor 650 for appropriate conversion to a digital display 660 provided to the user.

Figure 4:
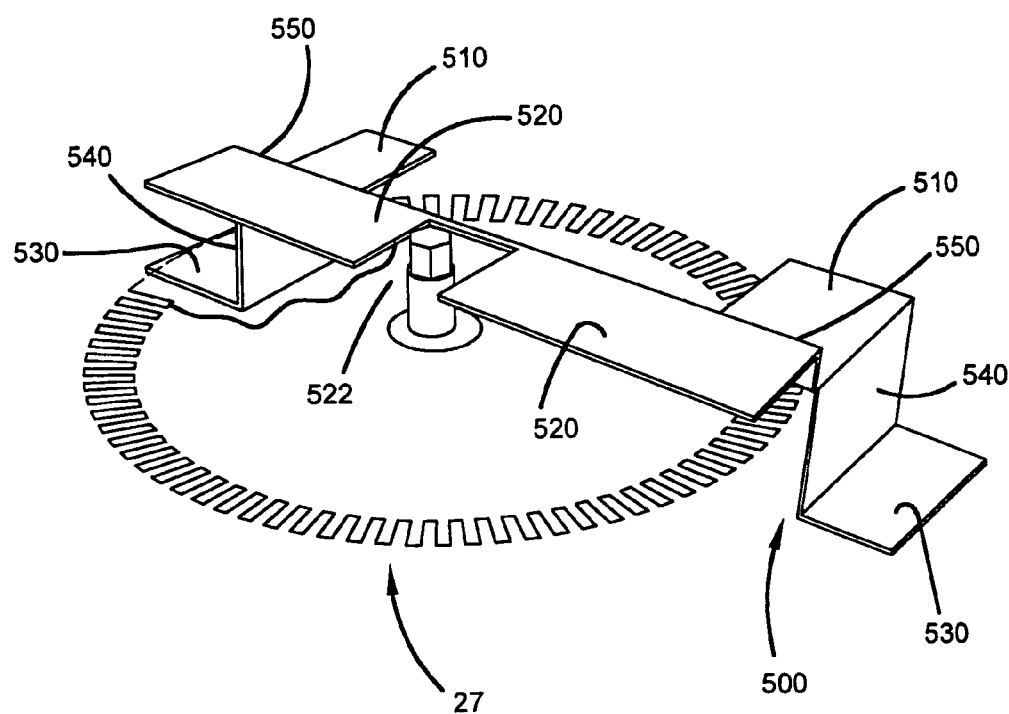
FIG. 4 is a schematic illustration of the structural configuration for supporting the dual display system according to the present invention.

FIG. 4 illustrates the structural configuration for supporting the dual display system of the present invention. As shown in FIG. 4, bridge 500 spans the dial 27 and channel 30 and includes a pair of planar horizontal segments 510 that support the digital display device 330 (i.e. digital display device 330 and microprocessor 650 have supporting portions resting thereon) and a pair of elevated planar horizontal members 520 (elevated relative to members 520) for supporting fixed disc 400 (or 400'). The bridge has planar side portions 530 secured to the base via conventional means, such as rivets, welds or other well known securing methods. Vertically extending segments 540 each connect a corresponding one of the substantially planar horizontal segments 510 with a given end of each of the side portions 530. Elevated planar members 520 are elevated from planar horizontal segments 510 by means of vertical wall segment 550. A gap or space 522 is formed between elevated planar horizontal members 520 to accommodate shaft 32. In this manner, bridge 500 provides a support platform for both the fixed disc and the digital display device.

Figure 3:
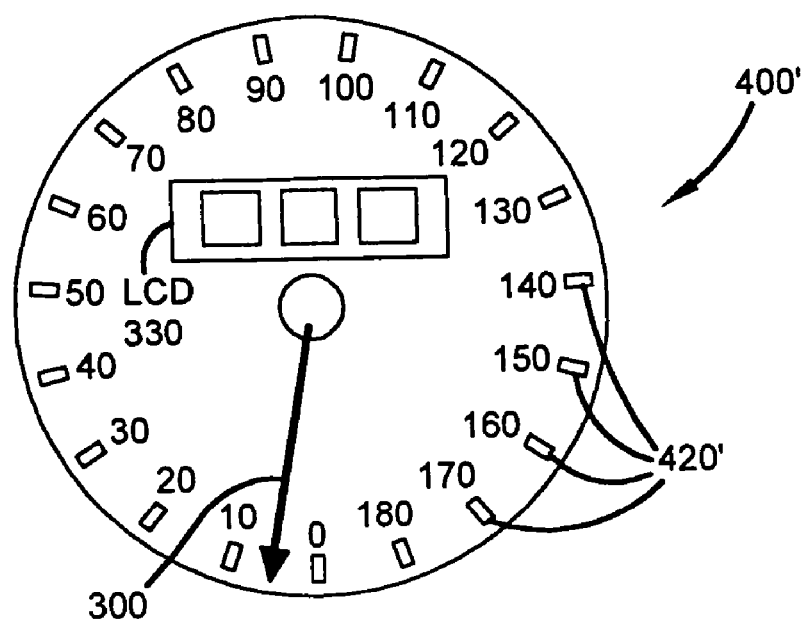
FIG. 3 is a schematic illustration of the dual display system according to an alternative embodiment of the present invention.

In an alternative embodiment, the dual display scale system according to the invention may be modified in the following manner. As shown in FIG. 3, fixed flat disc 400' comprises, in addition to the indicia thereon corresponding to numeric values for a user's weight pointable thereto via rotatable pointer 300, corresponding slots or holes 4201 formed therein at predetermined portions or intervals on the disc which may be passed over via pointer 300. A series of photodetectors (not shown) are disposed beneath each of the corresponding holes or slots 4201 on fixed disc 4001 and are operable for detecting when the pointer passes over a corresponding slot on the fixed disc. This triggers an electrical signal which functions as a pulse count to the microprocessor unit. Each time the pointer 300 passes over a slot 4201, the slot is at least partially covered by the pointer, thus interrupting the ambient light from the transparent window 26 at the top of the scale. The corresponding photodetector is triggered causing a pulse count to be sent to the microprocessor. When the pointer stops rotating, corresponding to a given weight value, the microprocessor totals the number of pulse counts and converts that to a digital weight representation. In this manner the scale has both a visual analog output indicated by the rotatable pointer's angular position and corresponding indicia on disc 400', as well as a digital display output corresponding to the number of pulses sensed by the optical sensor system due to the rotating pointer passing over fixed disc 400'. Such a configuration eliminates the need for the rotating disc 27 shown FIG. 2. In addition, the above-described configuration eliminates the need for a separate electronic photo emitting device. It should be noted, however, that a configuration having separate photo emitters and detectors disposed, respectively, above and beneath each of the slots on fixed disc 4001 for sensing the motion of the pointer of the slots and providing a corresponding pulse count to a processor for digital display is also contemplated.

Figure 5:
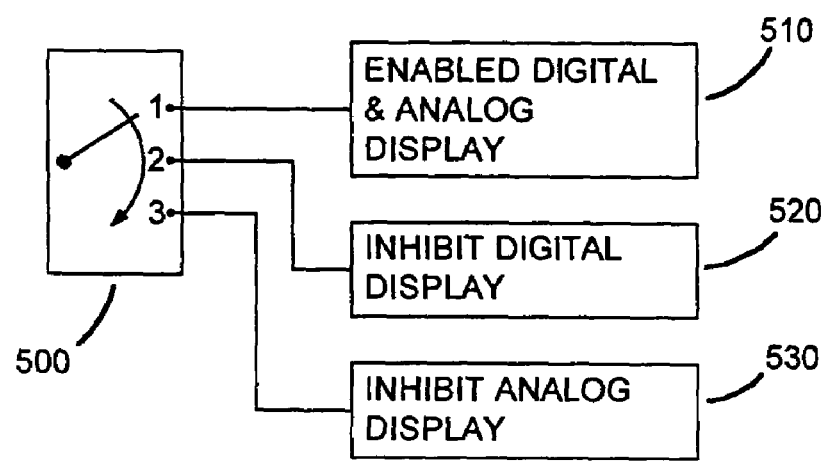
FIG. 5 is a block diagram illustrating a switch for selectively displaying analog or digital output data according to an aspect of the present invention.

As shown in schematically in FIG. 5, the dual display system of the present invention may be modified so as to enable a user to selectively determine the type of measurement and output display associated with the mechanical bathroom scale of the present invention. For example, a user-activatable switch 500 may be disposed on a side portion of the base 10 and operatively coupled (e.g. electrically and/or mechanically coupled) to both the analog and digital mechanisms within the scale so as to selectively activate or inactivate either the digital or the analog output display of the user's weight. For example, the switch 500 may be operatively coupled to both the pointer 300 (via mechanical or electromechancial coupling, for example) and to the microprocessor 650 or LCD output display (via electrical coupling, for example) at a first setting or position 1 such that the weight of a user is sensed in the manner described above and output to the user at both displays (module 510).

Alternatively, placing the switch 500 in a second position 2 causes a control signal to be sent to the microcontroller 650 for inhibiting display of the LCD (module 520) via the optical sensing system described above. In this case, only an analog readout out of the user's weight is obtained via the rotating pointer.

In a third case, placing the switch 500 in a third position 3 may cause a mechanical (or electromechanical, for example) motion or retraction of the stem of pointer 300 from shaft 32. This may be accomplished through a variety of methods well known in the art to decouple the stem portion of the pointer from the rotatable shaft to permit shaft rotation without the corresponding rotation of the pointer. For example, a mechanical actuator responsive to the position switch may effect a vertical displacement of the pointer relative to the shaft so as to decouple these elements, thereby preventing rotation of the pointer and inhibiting analog display (module 530).

Alternatively, the pointer may be constricted circumferentially about the shaft via a retractable ring, for example, such that retraction of the ring results in a corresponding expansion of the circumference of the pointer, thereby enabling rotation of the shaft without corresponding pointer rotation. In this case, selective disabling of the analog pointer allows only a digital readout out of the user's weight to be obtained via the LCD display.

It is to be understood that the user-activatable switch described above need not include all three selection positions. For example, the switch may be implemented with only the first and third selection positions described herein in accordance with the first embodiment described above and illustrated in FIG. 2. Alternatively, the second embodiment as illustrated in FIG. 3, may be implemented using only the first and second selection switch positions, since in the second embodiment the rotational pointer 300 is also utilized in determining the digital output display via the optical sensing system.

Figure 7A:
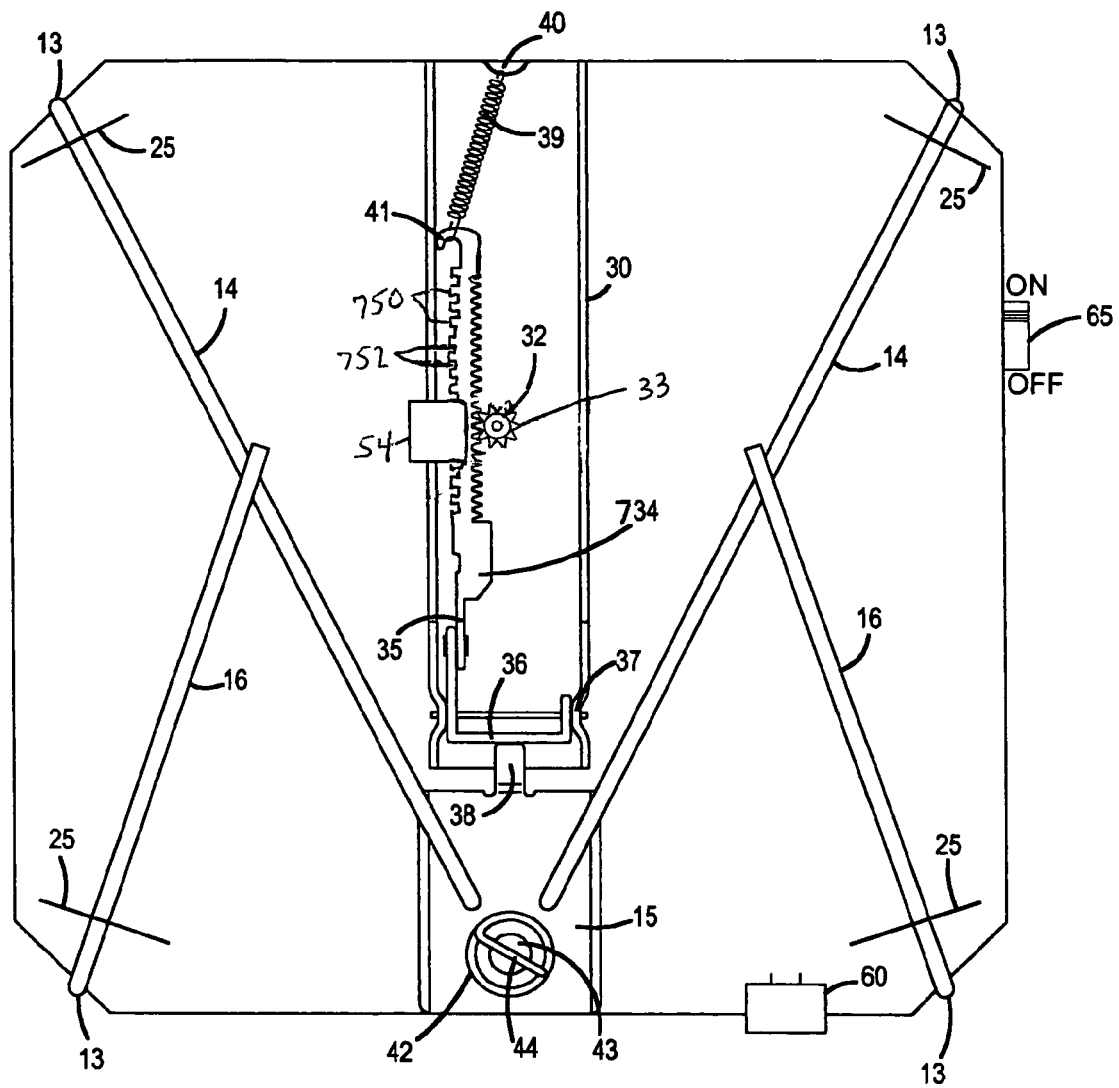
FIGS. 7A and 7B are schematic illustrations of the dual display system according to alternative embodiments of the present invention.
Figure 7B:
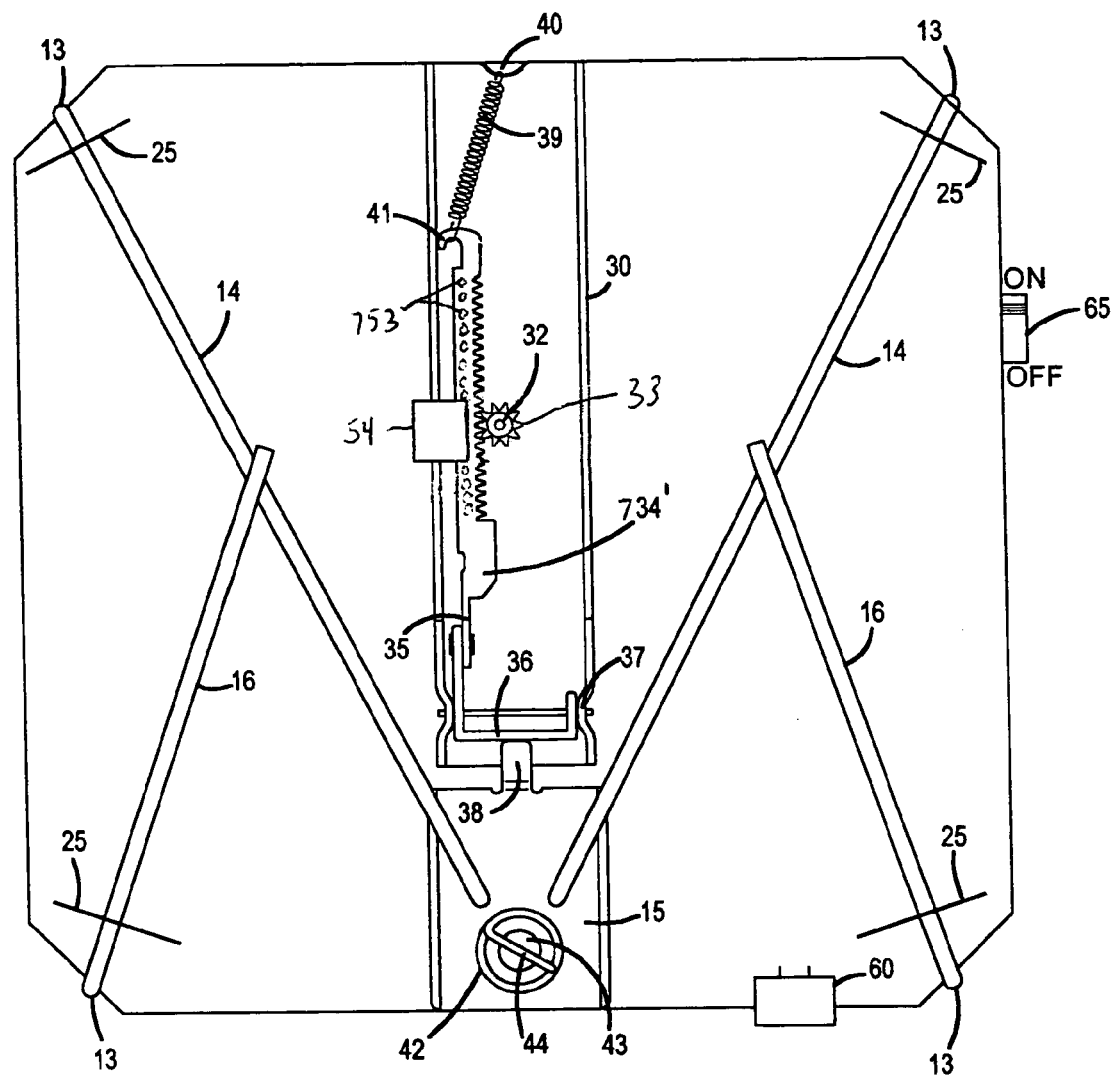

FIGS. 7A and 7B show alternate embodiments of the dual display scale system. These scale systems are substantially similar to the scale system shown in the embodiment of FIGS. 1A, 1B, and 2, except that the optical pulse counter is integrated with the rack 734, 734' of the weight sensing mechanism. As shown in FIG. 7A, the rack 734 may be constructed to include a plurality of spaced tabs 750 defining slots 752 therebetween. In FIG. 7B, the rack 734' may be constructed to include a plurality of spaced apart apertures 753. Thus, the dial 27 shown in the embodiment of FIG. 2 can be omitted. The previously described optical interrupter 54 used for optical sensing in the embodiment shown in FIG. 2 may be used in these embodiments for sensing linear movement of the rack 734, 734' and generating pulse signals in response thereto.

Figure 8:
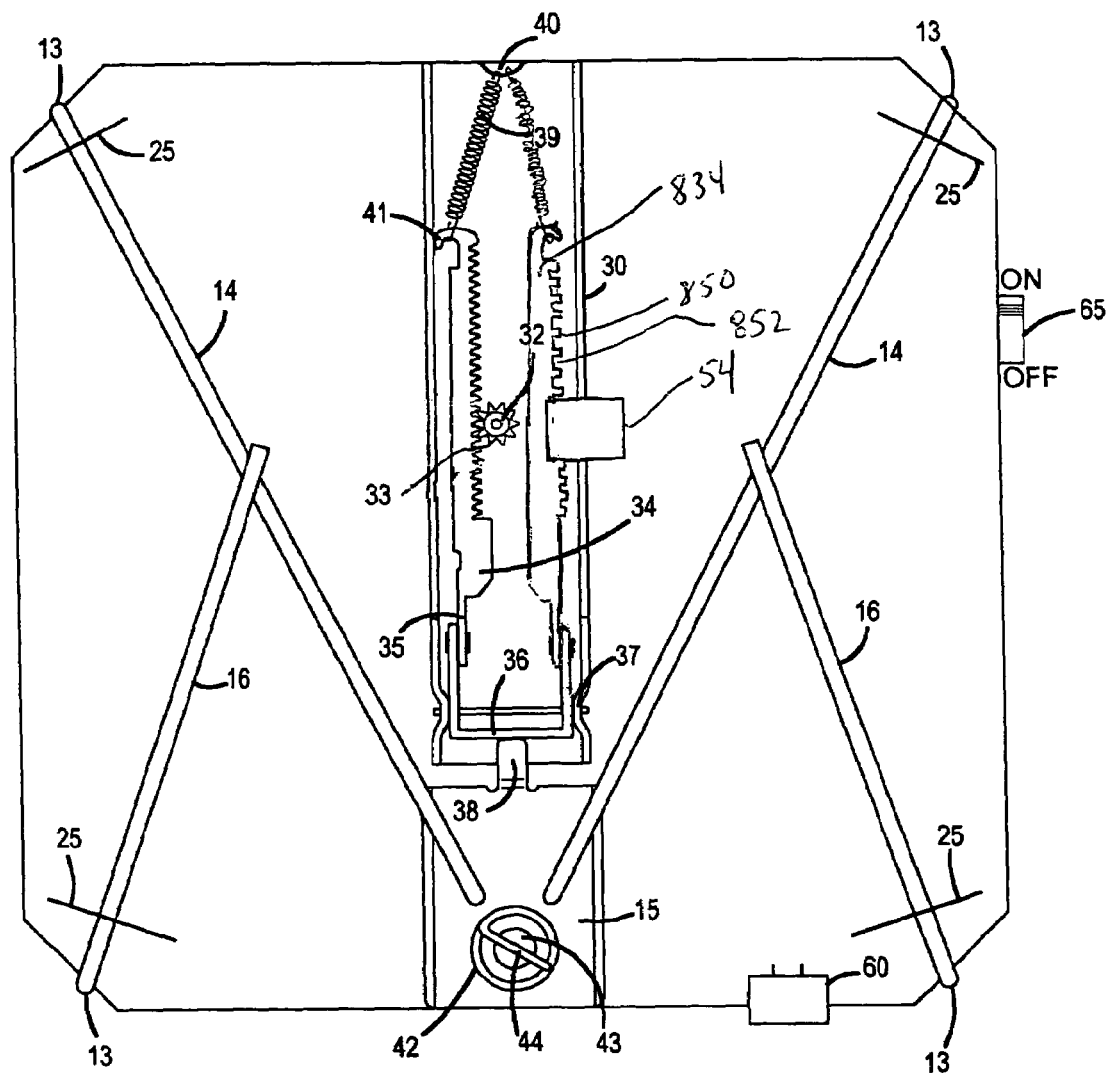
FIG. 8 is a schematic illustration of the dual display system according to yet another embodiment of the present invention.

FIG. 8 shows yet another embodiment of the dual display scale system. In this scale system, an additional rack 834 is utilized for the optical pulse counter. The additional rack 834 replaces the dial 27 shown in the embodiment of FIG. 2. The additional rack 834 may be constructed to include a plurality of spaced, tabs 850 defining slots 852 therebetween or a plurality of spaced apart apertures similar to those shown in FIG. 7B. The previously described optical interrupter 54 used for optical sensing in the embodiment shown in FIG. 2 may be used in this embodiment for sensing linear movement of the rack 834 and generating pulse signals in response thereto.

Figure 9A:
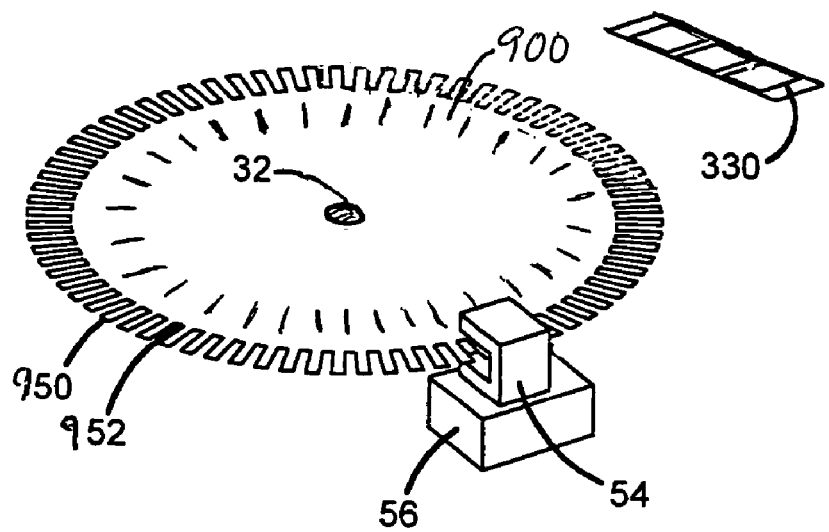
FIGS. 9A and 9B are schematic illustrations of the dual display system according to still other alternative embodiments of the present invention.
Figure 9B:
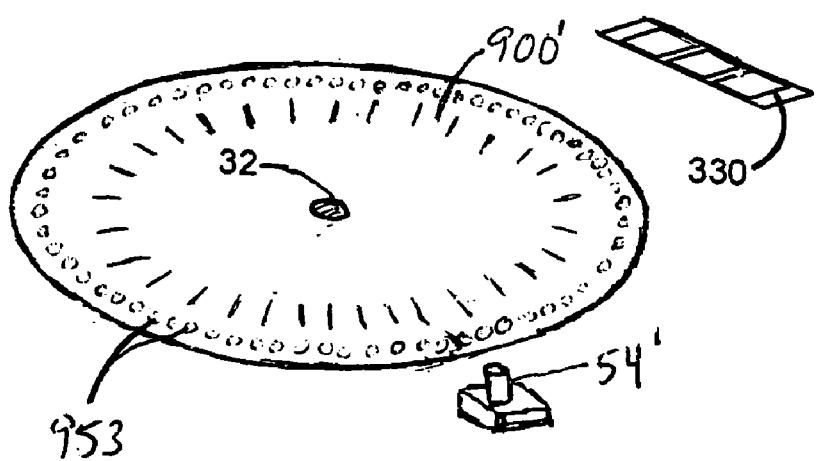

FIGS. 9A and 9B show other embodiments of the dual display scale system. In these embodiments of the scale system, the optical pulse counter is integrated with the disc-shape analog display. In FIG. 9A, the disc-shape analog display 900 may be constructed to include a plurality of spaced, tabs 950 defining slots 952 therebetween. In FIG. 9B, the disc-shape analog display 900' may be constructed to include a plurality of spaced apart apertures 953, similar to disc 400 (FIG. 3). The analog display 900, 900' in both of these embodiments may be coupled to the shaft for rotation therewith. The pointer (not shown) in these embodiments is made stationary or fixed, for example, by incorporating the pointer into the clear protective closure typically used for covering and protecting the analog display. In addition, the LCD display 330 is repositioned to a location outside of the analog display, for example, above the analog display. Integrating the optical pulse counter into the analog display allows the dial 27 shown in the embodiment of FIG. 2 to be omitted. The previously described optical interrupter 54 comprising the two photosensing elements (a light source and corresponding light detector) used for optical sensing in the embodiment shown in FIG. 2 may be used in these embodiments for sensing the rotary movement of the analog display and generating pulse signals in response thereto (FIG. 9A). Alternatively, the optical interrupter 54 may comprise just a light detector 54' which senses ambient light (FIG. 9B).

Figure 10A:
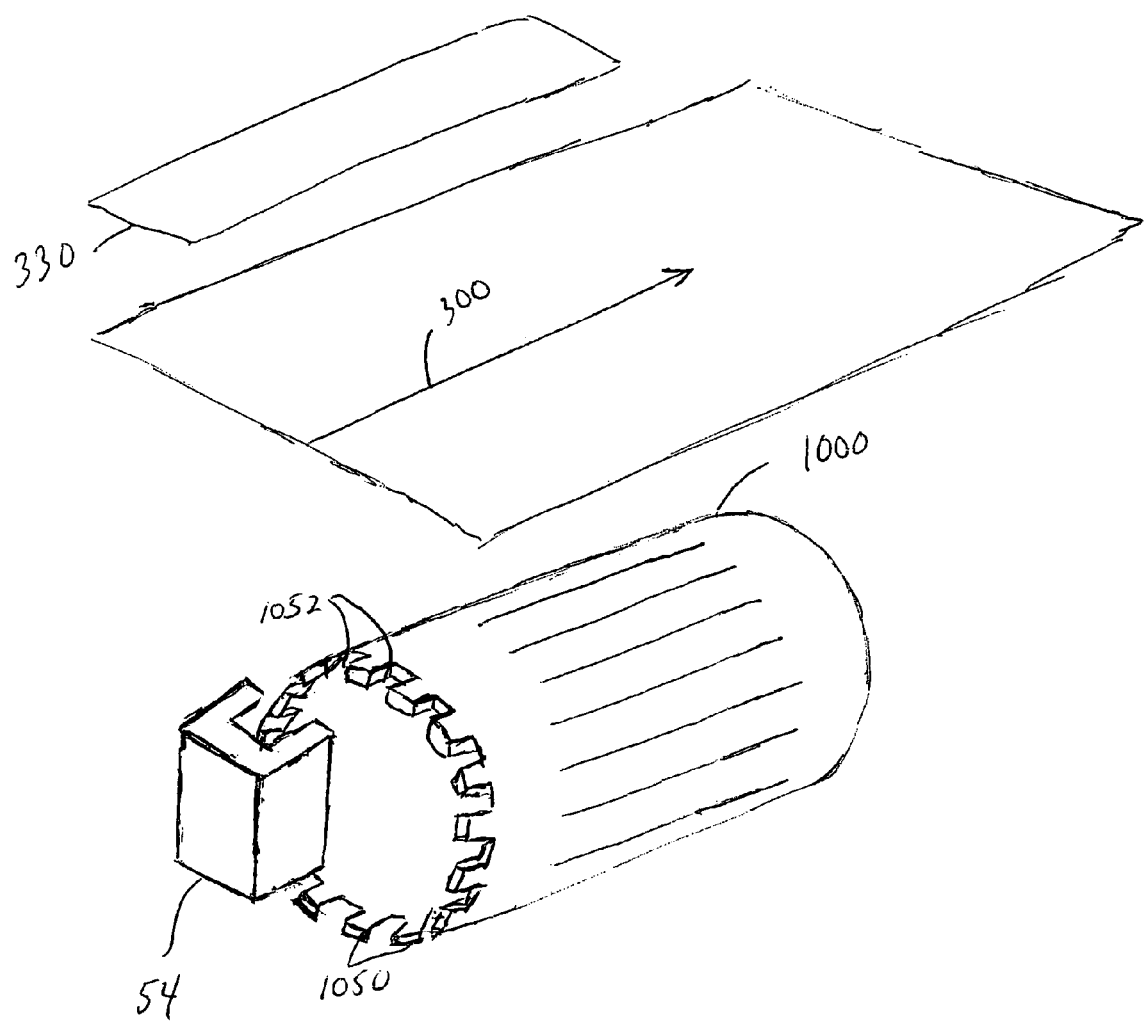
FIGS. 10A and 10B are schematic illustrations of the dual display system according to further embodiments of the present invention.
Figure 10B:
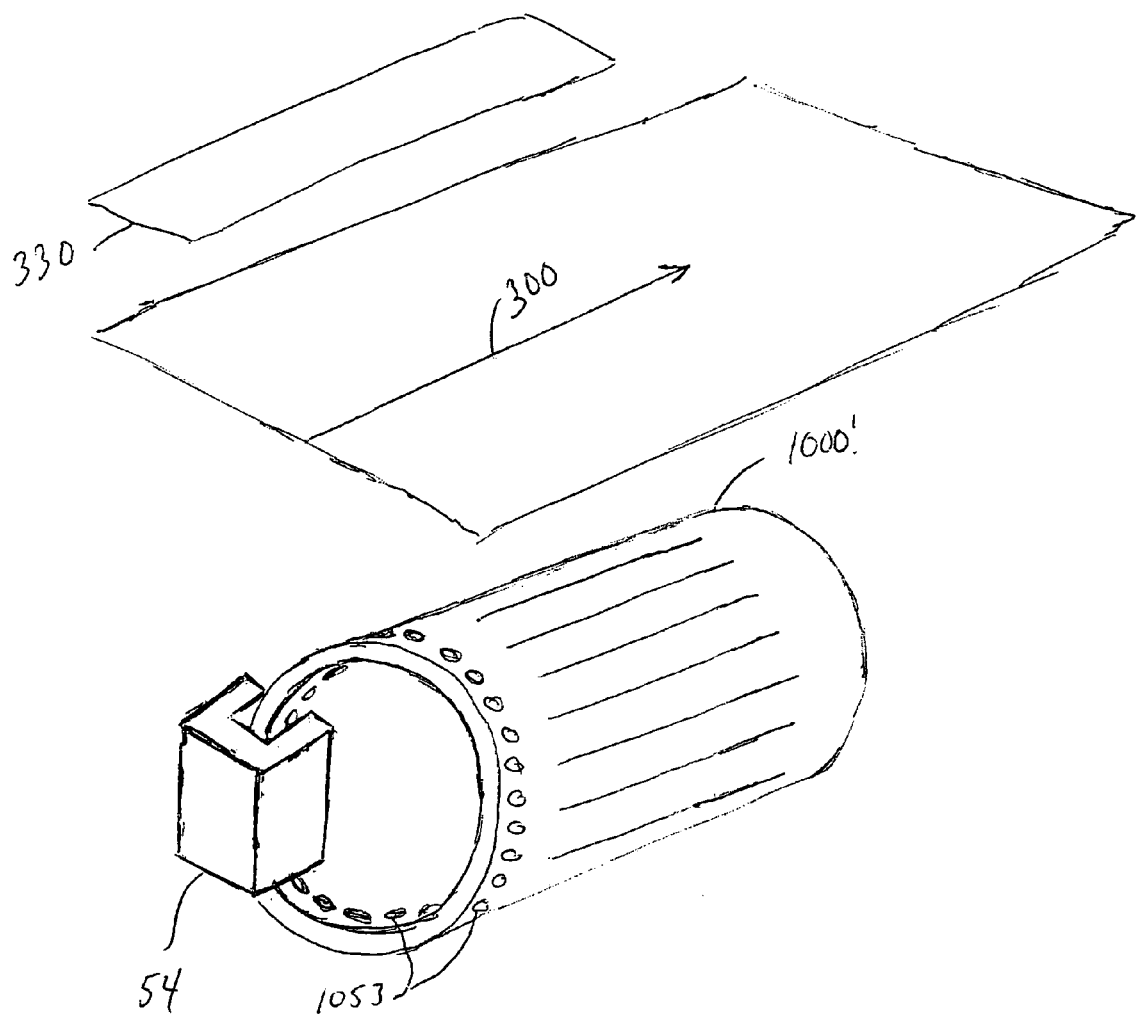

As shown in the embodiments of FIGS. 10A and 10B, the analog display may also be constructed as a drum 1000, 1000' and the optical pulse counter features, e.g., tabs 1050 and slots 1052 (FIG. 10A) or apertures 1053 (FIG. 10B) may be integrated with the drum 1000, 1000'. The rack driven shaft may be adapted to rotate the drum using any conventional transmission arrangement.

It is to be understood that one skilled in the art may make many variations and modifications to that described herein. For example, a cantilever beam load cell under the spring that drives the wheel may be added, relative to the rotating dial. Additional electronic circuitry may also be added so as to determine body fat, body mass index based on the calculated weight from the mechanical scale. Further, a magnetic pulse sensor may be used in place of the optical pulse sensor. In such a sensor arrangement, the optical interrupter may be replaced by a magnetic interrupter. In addition, the analog display and/or dial may also be embodied as a wheel or gear, segments of a wheel or gear, or disc- or drum-shape segments. All such variations and modifications of the above components and structures are intended to be included within the scope of the invention.

I claim:

1. A mechanical weighing scale comprising:
   a platform for supporting an object to be weighed;
   an analog display for indicating a weight of the object;
   a digital display for indicating the weight of the object;
   a movable member associated with a plurality of openings;
   a mechanical weight sensing arrangement including at least one lever mechanically responsive to the platform, a calibration plate mechanically responsive to the at least one lever, and a rack and pinion arrangement mechanically responsive to the calibration plate, the mechanical weight sensing arrangement for sensing the weight of the object supported on the platform, mechanically causing the analog display to indicate the sensed weight of the object, and moving the movable member in proportion to the sensed weight of the object; a sensor arrangement for sensing the openings as the movable member moves in proportion to the sensed weight and generating a pulse for each of the openings sensed;
   and a processor for counting the pulses, converting the counted pulses into a corresponding value of the weight sensed, and causing the digital display to display the value of the weight sensed;
   wherein the movable member is selected from the group consisting of a pointer, a gear driven rack, a rotatable drum-shaped dial and a segment of a rotatable drum-shaped dial.

2. The scale according to claim 1, wherein the openings are slots defined between spaced apart tabs.

3. The scale according to claim 1, wherein the moveable member is moved by the rack and pinion arrangement of the mechanical weight sensing arrangement.

4. The scale according to claim 1, wherein the movable member comprises a component of the analog display.

5. The scale according to claim 4, wherein the movable member comprises a pointer.

6. The scale according to claim 5, wherein the pointer is moved by the rack and pinion arrangement of the mechanical weight sensing arrangement.

7. The scale according to claim 5, wherein the analog display further comprises a face having indicia thereon corresponding to numeric values of weight, the pointer being movable over the face.

8. The scale according to claim 7, wherein the face defines the openings.

9. The scale according to claim 4, wherein the movable member includes indicia corresponding to numeric values of weight.

10. The scale according to claim 9, wherein the analog display further comprises a stationary pointer, the moveable member moving under the pointer.

11. The scale according to claim 10, wherein the movable member defines the openings.

12. The scale according to claim 4, wherein the movable member defines the openings.

13. The scale according to claim 12, wherein the openings are slots defined between spaced apart tabs.

14. The scale according to claim 4, wherein the moveable member is moved by the rack and pinion arrangement of the mechanical weight sensing arrangement.

15. The scale according to claim 1, wherein the sensor arrangement comprises an optical interrupter.

16. The scale according to claim 15, wherein the optical interrupter comprises a photosensing element and a corresponding light-emitting element.

17. The scale according to claim 1, wherein the sensor arrangement comprises a plurality of light-sensing elements.

18. The scale according to claim 17, wherein each of the light-sensing elements is associated with one of the openings.

19. The scale according to claim 18, wherein the sensor arrangement further comprises a plurality of light-emitting elements, each of the light-emitting elements for emitting light to be detected by a corresponding one of the light-sensing elements.

20. A mechanical weighing scale comprising:
   a platform for supporting an object to be weighed;
   an analog display for indicating a weight of the object;
   a digital display for indicating the weight of the object;
   a mechanical weight sensing arrangement including at least one lever mechanically responsive to the platform, a calibration plate mechanically responsive to the at least one lever, and a rack and pinion arrangement mechanically responsive to the calibration plate, the mechanical weight sensing arrangement for sensing the weight of the object supported on the platform and mechanically causing the analog display to indicate the sensed weight of the object, the rack and pinion arrangement including a rack member having a plurality of openings;

a sensor arrangement for sensing the openings as the rack member moves in proportion to the sensed weight and generating a pulse for each of the openings sensed; and a processor for counting the pulses, converting the counted pulses into a corresponding value of the weight sensed, and causing the digital display to display the value of the weight sensed.

21. The scale according to claim 20, wherein the openings are slots defined between spaced apart tabs.

22. The scale according to claim 20, wherein the sensor arrangement comprises an optical interrupter.

23. The scale according to claim 22, wherein the optical interrupter comprises a photosensing element and a corresponding light-emitting element.

24. The scale according to claim 1, wherein the movable member comprises a gear driven rack.

25. The scale according to claim 1, wherein the movable member comprises a rotatable drum-shape dial or a segment of a rotatable drum-shape dial.

* * * * *